(12) United States Patent
Whitsitt et al.

(10) Patent No.: US 8,600,817 B2
(45) Date of Patent: *Dec. 3, 2013

(54) USING ALERTS TO BRING ATTENTION TO IN-STORE INFORMATION

(75) Inventors: Michael S. Whitsitt, Lakeville, MN (US); Stephanie W. Lund, Minneapolis, MN (US); Eric P. Busch, St. Louis Park, MN (US); Carlos R. Eberhardt, Wyoming, MN (US); Robb S. Neuenschwander, Hudson, WI (US); Donald L. Sawyer, Minneapolis, MN (US); Ryan R. Tetter, Blaine, MN (US); Lucas W. Van Epern, Crystal, MN (US)

(73) Assignee: Target Brands, Inc., Minneapolis, MN (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/987,705

(22) Filed: Jan. 10, 2011

(65) Prior Publication Data

US 2011/0125541 A1      May 26, 2011

Related U.S. Application Data

(63) Continuation of application No. 12/112,861, filed on Apr. 30, 2008, now Pat. No. 7,890,370.

(51) Int. Cl.
*G06Q 20/20*      (2012.01)
(52) U.S. Cl.
USPC ............... 705/16; 705/7.15; 705/7.26
(58) Field of Classification Search
USPC ............... 705/16; 340/506, 520; 718/100
See application file for complete search history.

(56) References Cited

U.S. PATENT DOCUMENTS

| 4,978,305 A | 12/1990 | Kraft |
| 5,212,635 A | 5/1993 | Ferriter |

(Continued)

FOREIGN PATENT DOCUMENTS

| JP | 10263132 A | 10/1998 |
| JP | 11334254 A | 12/1999 |

(Continued)

OTHER PUBLICATIONS

Proven software solution launches the Element Control Software Platform for Managing network Elements; Mar. 28, 2008, Newswire.*

(Continued)

*Primary Examiner* — Matthew Gart
*Assistant Examiner* — Talia Crawley
(74) *Attorney, Agent, or Firm* — Leanne Taveggia Farrell; Westman, Champlin & Koehler, P.A.

(57) ABSTRACT

A method and system is provided that uses alerts to bring in-store information that is of interest to the attention of team members working in a retail store. To send an alert to a team member logged in to a device data, data from a source is evaluated against business rules. An event is generated when a piece of data satisfies the business rules. The event indicates that the piece of data is of interest. A task is activated for the event and assigned to the team member acting in a role associated with the source of the event. An alert is sent to the device that the team member is logged in to indicating that the team member has been assigned the task.

18 Claims, 9 Drawing Sheets

(56) References Cited

U.S. PATENT DOCUMENTS

| | | | |
|---|---|---|---|
| 5,326,270 A | | 7/1994 | Ostby et al. |
| 5,390,107 A | * | 2/1995 | Nelson et al. ............... 705/7.13 |
| 5,500,795 A | | 3/1996 | Powers et al. |
| 5,557,513 A | * | 9/1996 | Frey et al. .................... 705/7.12 |
| 5,799,286 A | | 8/1998 | Morgan et al. |
| 5,847,971 A | | 12/1998 | Ladner et al. |
| 5,900,801 A | * | 5/1999 | Heagle et al. ............ 340/286.09 |
| 5,939,974 A | * | 8/1999 | Heagle et al. ............ 340/286.09 |
| 6,119,097 A | | 9/2000 | Ibarra |
| 6,122,559 A | | 9/2000 | Bohn |
| 6,192,400 B1 | | 2/2001 | Hanson et al. |
| 6,275,812 B1 | | 8/2001 | Haq et al. |
| 6,349,327 B1 | * | 2/2002 | Tang et al. ................... 709/205 |
| 6,401,072 B1 | * | 6/2002 | Haudenschild et al. .......... 705/3 |
| 6,424,968 B1 | * | 7/2002 | Broster et al. ....................... 1/1 |
| 6,704,874 B1 | * | 3/2004 | Porras et al. ................... 726/22 |
| 6,750,766 B1 | * | 6/2004 | Heitner et al. ................ 340/525 |
| 6,838,977 B2 | | 1/2005 | Chen et al. |
| 6,921,266 B2 | | 7/2005 | Kon |
| 6,922,133 B2 | | 7/2005 | Wolfe |
| 6,976,002 B1 | | 12/2005 | Ferguson et al. |
| 7,033,180 B2 | | 4/2006 | Fujita |
| 7,122,944 B2 | | 10/2006 | Grimshaw |
| 7,195,489 B2 | | 3/2007 | Fujita |
| 7,671,728 B2 | * | 3/2010 | Buehler ........................ 340/506 |
| 8,217,756 B2 | * | 7/2012 | Kumar et al. ................. 340/5.92 |
| 8,250,637 B2 | * | 8/2012 | Allen et al. ....................... 726/6 |
| 8,280,844 B2 | * | 10/2012 | Warn et al. .................... 707/607 |
| 8,346,634 B2 | * | 1/2013 | Shiftan et al. .................... 705/28 |
| 2002/0019765 A1 | | 2/2002 | Mann et al. |
| 2002/0019766 A1 | | 2/2002 | Higashi et al. |
| 2002/0077884 A1 | | 6/2002 | Sketch |
| 2002/0120493 A1 | | 8/2002 | Mormile |
| 2003/0225589 A1 | * | 12/2003 | Eaton et al. ....................... 705/1 |
| 2004/0059790 A1 | * | 3/2004 | Austin-Lane et al. ......... 709/207 |
| 2004/0093263 A1 | | 5/2004 | Doraisamy et al. |
| 2004/0128353 A1 | * | 7/2004 | Goodman et al. ............. 709/204 |
| 2004/0176107 A1 | * | 9/2004 | Chadha ...................... 455/456.5 |
| 2005/0048451 A1 | | 3/2005 | Fujita |
| 2005/0108074 A1 | * | 5/2005 | Bloechl et al. ..................... 705/8 |
| 2005/0182761 A1 | | 8/2005 | Kato |
| 2005/0216331 A1 | | 9/2005 | Ahrens et al. |
| 2005/0283753 A1 | * | 12/2005 | Ho et al. ....................... 717/102 |
| 2006/0020942 A1 | * | 1/2006 | Ly et al. ........................ 718/100 |
| 2006/0087411 A1 | | 4/2006 | Chang |
| 2007/0112607 A1 | * | 5/2007 | Tien et al. .......................... 705/7 |
| 2007/0152810 A1 | * | 7/2007 | Livingston et al. ......... 340/539.1 |
| 2007/0279214 A1 | * | 12/2007 | Buehler ........................ 340/521 |
| 2009/0271862 A1 | * | 10/2009 | Allen et al. ..................... 726/22 |

FOREIGN PATENT DOCUMENTS

| | | |
|---|---|---|
| JP | 2003233701 A | 8/2003 |
| JP | 2004247966 A | 9/2004 |
| JP | 2004303033 A | 10/2004 |
| JP | 2005100087 A | 4/2005 |
| JP | 2006031712 A | 2/2006 |
| JP | 2006129385 A | 5/2006 |
| JP | 2006344191 A | 12/2006 |

OTHER PUBLICATIONS

POS Page keeps staff in touch, Jan. 10, 2008, In Store Marketing.*

"Fair Isaac Improves Blaze Advisor Rules Management with New Features for Score Model Creation and Execution, Business Wire", Jun. 7, 2004, pp. 1-3, http://findarticles.com/p/articles/mi_m0EIN/is_2004_June_7/ai_n6056939/print (last visited Apr. 22, 2008).

"The Avalon project at Yale Law School", http://www.yale.edu/lawweb/avalon/sept_11/s1447_enr.htm as of Dec. 26, 2007.

Proven Software Solution launches the Element Control Software Platform for Managing network elements; Mar. 28, 2008, Newswire, pp. 1-3.

POS Page keeps staff in touch, Jan. 10, 2008, In Store Marketing, pp. 1-2.

* cited by examiner

User Name   Time
        | Edit | Delete | Save | CheckIn | CheckOut | Promote |    300

Store Filter: All Stores          [▼]
       Store(s): 9969; 9413
     Prototype: Target        [▼]
       Region: R191       [▼]     District: R124       [▼]
302    State: MN          [▼]     County: <none>       [▼]
        City: <none>      [▼]

Event Name: Transaction Over Dollar Limit
     Activation Date: 11/01/2007   Expiration Date:  12/31/9999
304

If     TransactionCreated
        And    DiscountAmount [▼]  [= ▼]  [20          ]
        And    SubTotalAmount [▼]  [>=▼]  [200         ]
306     And    TransactionType [▼] [= ▼]  [Sale        ]
        <<add condition>>

Brief Message:  Reg: <RegisterNo> Lane: <LaneNo.>
                     Discount Overlimit
     Detailed Message:
                   * Reg: <RegisterNo>
                     <<add attribute>>
                     ┌─────────────────┐
308                  │ Free Text    [▼]│
                     │ Transaction     │
                     │ EventSource     │
                     │ Team Member     │
                     └─────────────────┘

FIG. 3

500
                                    User Name   Time
   | Edit | Delete | Save | CheckIn | CheckOut | Promote |
   Select Event Name For
   Which Duplicate Rules Are     Transaction Over Dollar Limit [▼]
   To Be Set:

Duplicate Event Attributes
   Select Level For Matching Events:  Store, Register, Tran, Item
   Time Limit For Sending Duplicate
   Event (Secs):                      180

FIG. 5

600
                                  USER NAME  TIME
| Edit | Delete | Save | CheckIn | CheckOut | Promote |

Select Task Name Which Has To Be Closed:  [Transaction Over Dollar Limit ▼]
Select Event Name Which Is To Be Used To Close The Above Task:  [Transaction Over Dollar Limit Close]

Attribute To Match Close Alert with Open Alert on the PDA
Select Level For Matching:  [Register, Tran ▼]

FIG. 6

User Name  Time
| Edit | Delete | Save | CheckIn | CheckOut | Promote |   700

Select Name For Which Task Is To Be Set:  [Transaction Over Dollar Limit ▼]

Coaching Message (Optional):
[Instructurions/guidelines for work to be performed]

Task Priority Attributes:
| Task Priority: | [High ▼] |
| Guest Impact Indicator: | [Guest Waiting at Front Lane] |
| Compliance Impact Indicator: | [Store Policy Compliance ▼] |
| Fraud Impact Indicator: | [Guest Initiated Fraud Risk ▼] |
| Safety Impact Indicator: | [Guest and/or Team Member Safety Impact ▼] |

Task Handheld Device Attributes:
| Task Audible Flag: | [No ▼] |
| Task Vibrateable Flag: | [Yes ▼] |
| Task Dismissable Flag: | [No ▼] |
| Task Interruptible Flag: | [Yes ▼] |

User Role ID: [GSTL ▼]

FIG. 7

USING ALERTS TO BRING ATTENTION TO IN-STORE INFORMATION

CROSS-REFERENCE TO RELATED APPLICATION

The present application is a continuation of and claims priority to U.S. patent application Ser. No. 12/112,861, filed Apr. 30, 2008, the content of which is hereby incorporated by reference in its entirety.

BACKGROUND

In a retail store, sales are processed using point-of-sale registers. The speed with which guests' purchases are processed at a check-out is a major component of the overall shopping experience. As such, retailers want the check-out process to proceed as efficiently as possible.

From time-to-time, the team member at the register will require the assistance of a manager or another team member. In small retail stores, the manager is usually close to the register and can be spoken to directly. However, in larger retail stores where there are multiple registers spread across an area of the store, the manager may not be close to the team member that currently needs assistance.

To address this, larger retail stores have either used a light indicator at the register that provides a visual indication to the manager that their assistance is required or a paging system that provides a verbal request that can be heard by guests and the manager. Both of these systems are less than ideal because they typically do not inform the manager of what is needed at the register until the manager reaches the register. In addition, these systems both intrude on the guest experience and are perceived by the guests.

The discussion above is merely provided for general background information and is not intended to be used as an aid in determining the scope of the claimed subject matter.

SUMMARY

A method is provided that processes alerts for bringing in-store information that is of interest to the attention of team members working in a retail store. Alerts are received by team members via a device they are logged on to. To send an alert to a team member, point-of-sale data from point-of-sale registers are evaluated against business rules. An event is generated when point-of-sale data satisfy the business rules. A task is activated for the event and assigned to the team member acting in a role associated with a business area of the event. An alert is sent to the device that the team member is logged on to indicating that the team member has been assigned the task This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a screenshot illustrating an example event rule that could be included in event rules in the alert system of FIG. 2.

FIG. 5 is a screenshot illustrating an example duplicate rule that could be included in duplicate rules in the alert system of FIG. 2.

FIG. 6 is a screenshot illustrating an example closing task rule that could be included in closing task rules in the alert system of FIG. 2.

FIG. 7 is a screenshot illustrating an example new task that can be created with task activation rules in the alert system of FIG. 2.

DETAILED DESCRIPTION

Embodiments described herein include methods of processing alerts with an alert system to bring in-store information that is of interest to the attention of team members or users working in a retail establishment. Specific in-store information is presented to team members or users responsible for the information in the form of a task that needs to be performed. To raise these pieces of information, the alert system identifies business events from various sources of business data, such as data from a point-of-sale application, with business rules. A business event is a piece of data that is of interest. The business event is compared to other open events to determine whether the business event already exists. A task is activated for the event if the event is not a duplicate of other open events. After the task is activated, an alert is sent to a device that a team member or user is logged into. The team member is chosen based on the role the team member is performing and the business area the team member is covering. The alert indicates to the team member that they have been assigned the task.

Figure 1:
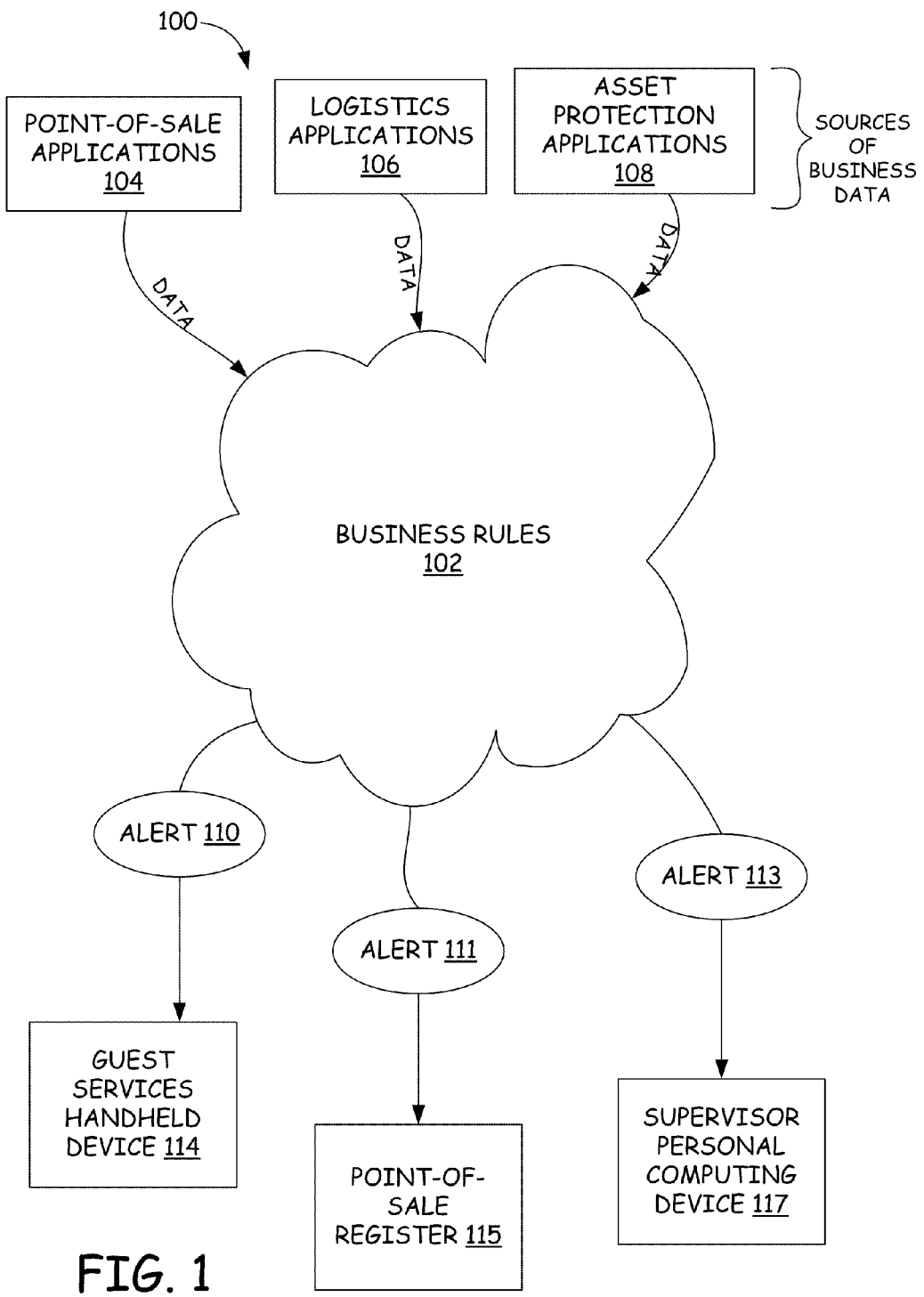
FIG. 1 illustrates a simplified block diagram of an alert system under one embodiment.

FIG. 1 is a simplified block diagram of an alert system 100 in accordance with one embodiment. Alert system 100 is for use in a suitable computing system environment. Examples of well known computing systems, environments, and/or configurations that are suitable for use with elements of alert system 100 include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of alert system 100 are described below in the general context of computer-executable instructions, such as program modules, being executed by a computer. Generally, program modules include routines, programs, objects, components, data structures, etc. that perform particular duties or implement particular abstract data types. Some embodiments are designed to be practiced in distributed computing environments where tasks are performed by remote processing devices that are linked through a communications network. In a distributed computing environment, program modules are located in both local and remote computer storage media (or computer readable media) including memory storage devices.

Alert system 100 is an exemplary embodiment of identifying in-store information that is of interest and alerting specific people to this information such that they can take action to address it. To identify in-store information that is of interest, a set of business rules 102 receives business data from a plurality of different sources. As illustrated in FIG. 1, sources of business data can include point-of-sale applications 104, logistics applications 106 and asset protection applications 108. Although FIG. 1 illustrates three sources of business data, it should be realized that these are examples and other sources of business data can be used.

Point-of-sale applications generally run on point-of-sale registers and are used by cashiers to process transactions related to purchasing merchandise and/or returning merchandise. Point-of-sale registers usually include a cash drawer for storing currency and checks, a credit card reader to process transactions tendered by credit card, a barcode scanner to scan price tags on items for item price look up and a receipt printer. Under embodiments described herein, point-of-sale applications can also monitor metrics related to the performance of the cashier who is running the point-of-sale application and can provide user interfaces for the cashier to request assistance, as described further below.

In one embodiment, point-of-sale applications 104 can provide data to business rules 102 including real-time sales transaction data, menu driven data that is inputted into a point-of-sale register by the team member via a selectable menu list, workflow stopping data and historical process transaction data. Examples of real-time sales transaction data include data related to items purchased such as item description and price, discounts applied by the cashier and how the transaction was tendered. Examples of selectable menu data include a cashier request to take a break, a cashier request for change for their register (i.e., the cash drawer needs more quarters) and a cashier request for a guest assisted carryout of a piece of merchandise. Examples of workflow stopping data include situations when the cashier needs a supervisor override on their point-of-sale register for a particular reason, such as the item scanned is alcohol and the cashier is a minor. Historical process transaction data is data related to the history of sales transactions that are being processed such as the number of discounts the cashier has entered, the number of times the cashier has keyed in a price instead of scanning a tag, and the number of times the cashier has performed suspend and retrieve transactions.

Logistics applications 106 are those applications that keep track of inventory received and located at the store as well as the inventory that is moved to the sales floor. For example, data passed from the logistics applications 106 to business rules 102 can include data related to pulling stock from the back and putting it on the sales floor. Asset protection applications 108 include applications used to monitor the store for theft or other illegal activity. For example, an asset protection application can monitor the opening and closing of certain doors and provide data indicating what doors have recently been opened.

As illustrated in FIG. 1, business rules 102 receive business data originating from point-of-sale applications 104, logistics applications 106 and asset protection applications 108 and identifies pieces of the business data that indicate information of interest that should be brought to a team member's or user's attention. Upon identification and processing of these pieces of data, an alert, such as alerts 110, 111 and 113, is sent out to a client device such as client devices 114, 115 and 117.

The alert is associated with a team member role or position and a business area or section and is directed to a particular client device by locating the client device logged into by a team member in that role for that business area or if there is no device for this role to log into, the alert is sent through a broadcast communication channel, such as a radio. For example, if there is no device for this role, alert 110 is associated with a user in charge of a group of point-of-sale registers. As a result, it is sent to client device 114, which is a guest services handheld device that has been logged into by a team member who is managing that group of point-of-sale registers. In another example, alert 111 is directed to a particular cashier who has been assigned to a particular point-of-sale register. As such, alert 111 is sent to the point-of-sale register 115 that the cashier is logged into. In yet another example, alert 113 is directed to a supervisor role in the store. Since the team member in that role is logged into personal computing device 117, alert 113 is directed to personal computing device 117.

Each alert 110, 111 and 113 notifies the user of each client device 114, 115 and 117 that a task has been assigned to them for responding to in-store information of interest as defined and identified by the business rules 102. Alerts can be in the form of an icon on a display of the client device and/or in the form of a vibration indication or audible noise indication on the device. Alerts may also take the form of a recorded or computer-generated verbal message. For example, a user on guest service handheld device 114 is notified of alert 110. By interacting with the icon corresponding to alert 110, the user can learn that "Lane 8 needs change" is their task. The user of client device 114 can perform the task assigned to them.

Figure 2:
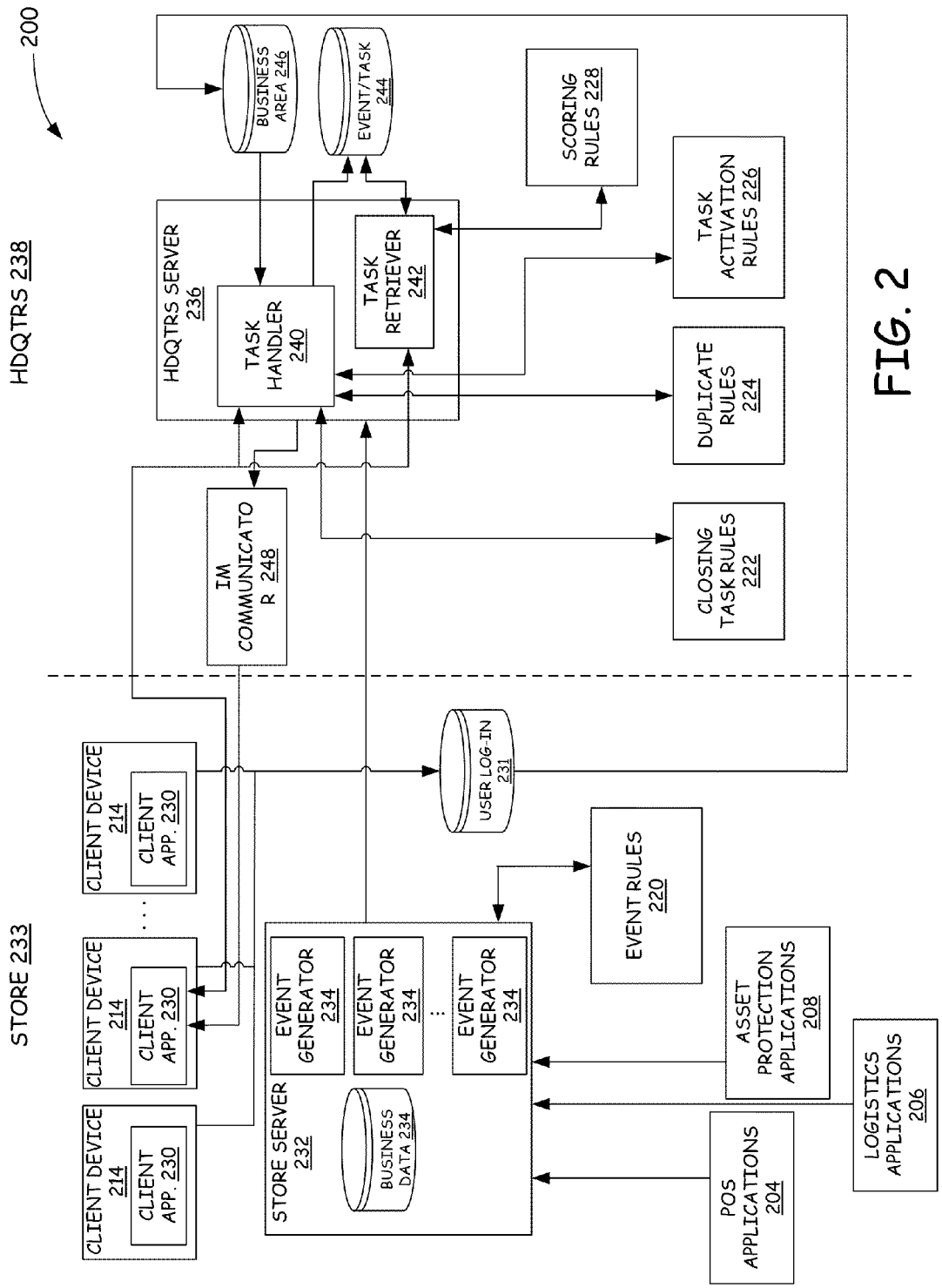
FIG. 2 illustrates a more detailed block diagram of an alert system under another embodiment.

FIG. 2 illustrates a detailed schematic diagram of an alert system 200 in accordance with another embodiment. Similar to FIG. 1, alert system 200 includes sources of business data from point-of-sale applications 204, logistics applications 206 and asset protection applications 208 that are located in a store 233. Alert system 200 includes event rules 220, closing task rules 222, duplicate rules 224, task activation rules 226 and scoring rules 228. In FIG. 2, these rules 220, 222, 224, 226 and 228 can all be modules of a business rules package as is represented in FIG. 1 as object 102.

Alert system 200 also includes a plurality of client devices 214. Each client device 214 includes a client application 230. A user can log-in to one of the plurality of client devices 214 such that the user is able to receive alerts indicating tasks that they have been assigned to accomplish. User log-in database 231 stores which users are logged in to which client devices 214. Example client devices 214 can include handheld devices, personal computing devices and point-of-sale registers as illustrated in FIG. 1.

In one embodiment, a user will log-in to an appropriate client device 214 as a select user role or position of a select business area or business section in the store. However, the user also may log-in to the appropriate client device as a plurality of different user roles and/or choose to receive alerts for a plurality of different business areas. For example, if the user can log-in to the client device 214 in a guest services manager role and select one area of the store where point-of-sale registers are located or select more than one business area of the store where point-of-sale registers are located. This ability to select more than one business area to receive alerts allows a single user to cover more business areas if there are no other available users in the store for those areas. In addition, it allows multiple users to receive the same alerts that cover more than one business area. This can drive competition between users to complete tasks, thus making the user more productive.

A store server 232 in store 233 receives business data from different business data sources 204, 206 and 208 and saves the data in a business data database 234. In one exemplary embodiment, a point-of-sale register running a point-of-sale application 204 publishes a stream of business data in an XML format that explains on a scan-by-scan basis details of each sales transaction. As previously discussed in regards to FIG. 1, besides business data including this real-time sales transaction data, business data from point-of-sale applications can also include menu driven data, workflow stopping data and historical transaction data. Store server 232 includes a plurality of event generators 234. Each event generator 234 evaluates data for each type of business data using event rules 220. For example, one event generator 234 will evaluate real-time transaction data from point-of-sale applications 204 and another event generator will evaluate menu driven data from point-of-sale applications 204. Event generators 234 will also evaluate data received from other applications, such as logistic applications 206 and asset protection applications 208 using event rules 220.

Event rules 220 are able to identify pieces of business data, such as pieces of point-of-sale data that trigger events. FIG. 3 is a screenshot 300 illustrating an example event rule that could be included in event rules 220. The event rule illustrated in FIG. 3 includes attributes that are defined in windows 302, 304, 306 and 308. In screenshot 300, the event rule is for a particular store or stores as selectable in window 302. As indicated in FIG. 3, the example event rule is created for stores 9969 and 9413. The event rule is called "Transaction Over Dollar Limit" that has an activation date and an expiration date as indicated in window 304. Window 306 includes the event conditions that define the event rule. As illustrated, a piece of point-of-sale data that would trigger this event rule includes data where a transaction includes a discounted amount equal to $20, a subtotal amount that is greater than or equal to $200 and a transaction type that is a sale. Window 308 includes messages, both brief and detailed, that are attached to the event rule.

Figure 4:
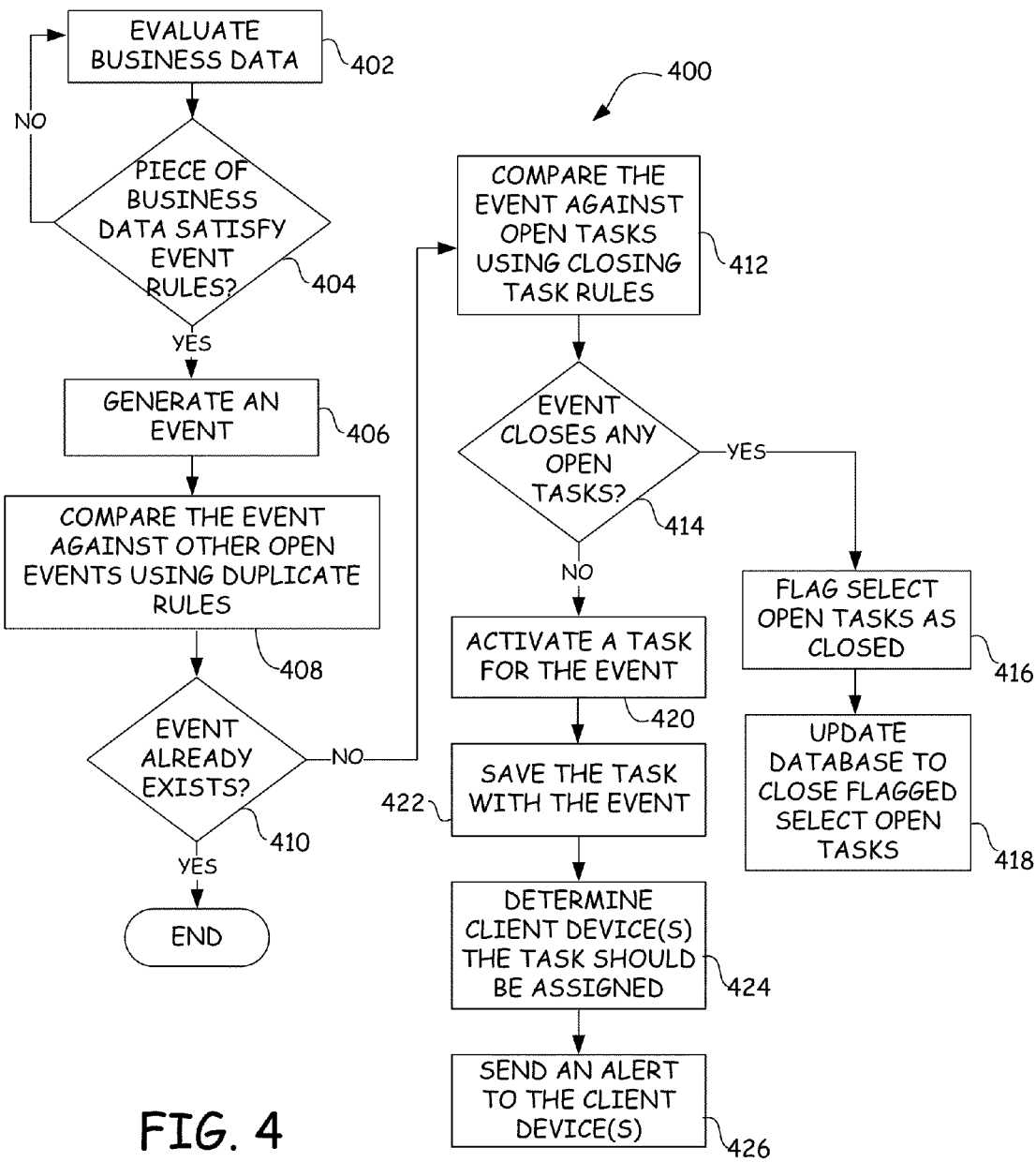
FIG. 4 is a flow diagram illustrating a method of using the alert system illustrated in FIG. 2.

FIG. 4 is a flow diagram 400 illustrating a method of using alert system 200 to bring in-store information of interest to the attention of team members or users. At block 402, event generators 234 evaluate business data using event rules 220. At block 404, the event generators 234 determine if pieces of business data satisfy the event rules 220. If not, event generators 234 continue to evaluate business data as it is received by store server 232. If pieces of business data satisfy an event rule 220, then the method proceeds to block 406 and event generators 234 generate an event.

Below are further examples of pieces of business data which satisfy event rules besides pieces of business data that satisfy the event rule illustrated in FIG. 3. It should be realized that this not an exhaustive list of possible pieces of data that would satisfy event rules. One example of real-time sales transaction data that satisfies an event rule in event rules 220 is data indicating that an item was entered into the point-of-sale register with a default department, class and item number and an item amount that is greater than $20. This collection of data would satisfy an event rule that is written to detect cashier fraud. One example of menu driven data that satisfies an event rule in event rules 220 includes a cashier request for supplies at their lane. One example of workflow stopping data that satisfies an event rule of event rules 220 is when a register has been left idle for more than two minutes in the middle of a transaction. One example of historical transaction data that satisfies an event rule in event rules 220 includes data indicating that a cashier scanned an item that was declined because it violated "the street date" at which time the item could begin to be sold, then, the cashier entered a default department, class and item number to the transaction so that the item could be purchased.

In one embodiment, after generating the event, one of the event generators 234 sends the event to a server 236 at a store headquarters 238. It should be realized that in other embodiments, the event need not be sent to a store headquarters 238. Instead, events can remain at store 233 for further processing and handling. However, for retail establishments that have a plurality of retail stores located across a region, receiving and handling events identified by event rules 220 from each store 233 at store headquarters 238 can be more efficient. For example, the amount of events that each retail store will have can vary. Some retail stores may have many events, while other retail stores may have very few. It is more efficient to handle the events at one central location to avoid dedicating hardware at a retail store that has few events. In another example, centralized event processing decreases deployment and maintenance costs compared to if event processing was done at each retail store.

Headquarters server 236 includes a task handler 240 and a task retriever 242. Task handler 240 is responsible for finding duplicate events for a given event, creating tasks for a non-duplicate event, closing a task given an event and closing an open task given a task identifier, event identifier and store identifier. Task retriever 242 is responsible for retrieving open tasks from an event/task database 244 for given client devices, user roles and business areas and scoring the open tasks. Task handler 240 and task retriever 242 are explained below in detail.

At block 408, the event received by headquarters 236 is handled by task handler 240 and compared against other open events using duplicate rules 224. At step 410, it is determined if the event already exists for the particular source of data in a particular store 233. To accomplish this, task handler 240 passes the event and a list of open events as well as recently closed events (i.e., event closed within the last hour or other period of time) from event/task database 244 into duplicate rules 224. Under one embodiment, task handler 240 passes only those tasks that are associated with the store and the specific source of data that the event was triggered from, such as data from POS applications 204, logistic applications 206 or asset protection applications 208.

The duplicate rules 224 compare attributes of the new event and open events to determine if the new event should be identified as a duplicate of an open event. Under one embodiment, a hierarchy of matching levels is found in duplicate rules 224. Each duplicate rule assigns an event with a matching level from the hierarchy set of matching levels. Under this hierarchy, upper level matching levels compare fewer attributes than lower level matching levels. For example, one matching level of comparing an event with open events is by determining whether the event has the same event identifier and the same store identifier as an open event. An example of a lower level rule is a rule that compares an event to other open events by determining whether the event has the same event identifier, the same store identifier and the same register identifier as an open event. Other levels include same event identifier, store identifier, register identifier, transaction identifier; same event identifier, store identifier, register identifier, transaction identifier and item identifier; and same event identifier, store identifier, user identifier and time identifier. If the event is a duplicate of one of the other open events based on a matching level, then the method illustrated in FIG. 4 will end. If, however, the event is not a duplicate of one of the other open events, then the method proceed to step 412.

FIG. 5 is a screenshot 500 illustrating an example duplicate rule that could be included in duplicate rules 224. The duplicate rule includes a field for selecting an event name in alert system 200 for which duplicate rules are to be set. As illustrated, the event name "Transaction Over Dollar Limit" is the event this duplicate rule is defining. The duplicate rule in FIG. 5 includes a matching level at which the event can be matched with the open task. In FIG. 5, the event matches another open event with the same name or event identifier if they both have the same store identifier, register identifier, transaction identifier and item identifier. The duplicate rule also includes a time limit for comparing the event to recently closed duplicate events. This time period is 180 seconds.

At step 412, task handler compares the event against open tasks using closing task rules 222. At step 414, it is determined if the event is instructive of closing an open task. To accomplish this, task handler 240 passes the event and a list of open tasks as well as recently closed tasks (i.e., tasks closed within the last hour or other period of time) from event/task database 244 into closing task rules 222. Task handler 240 passes only those tasks that are associated with the store, such as store 233, and with a specific source of data, such as data from POS application 204, that the event was triggered from and also compares the event with the open task based on a matching level. In general, each closing task rule can be matched with an event and open task at a store identifier and register identifier level; store identifier, register identifier and transaction identifier level; store identifier, register identifier, transaction identifier and item identifier level; or store identifier, team member identifier and time identifier level. If the event is not indicative of closing any of the open tasks, the method proceeds to block 420 to further process the event. If, however, the event is indicative of closing at least one of the open tasks, at block 416 in FIG. 4, closing task rules 222 sends the event back to task handler 240 with at least one open task that is flagged indicating to the task handler that the flagged open task should be closed. At block 418 in FIG. 4, task handler 240 updates event/task database 244 to close the at least one task that was flagged to be closed.

FIG. 6 is a screenshot 600 illustrating an example closing task rule that could be included in closing task rules 220. The closing task rule includes a field for selecting an open task name in alert system 200 that can be closed by an event. As illustrated, the event name "Transaction Over Dollar Limit Closed" is the event that can close the open task name "Transaction Over Dollar Limit " The closing rule illustrated in FIG. 6 also includes a selectable level at which the event can be matched with the open task. In FIG. 6, the closing task rule matches the event with an open task at a register identifier and transaction identifier level.

If the event is not a duplicate event, task handler 240 activates a task for the event using task activation rules 226 at step 420. Task handler 240 passes the event to task activation rules 226. Task activation rules 226 create a new task configured according to activation rules. Task activation rules 226 attach the new task to the event. Task handler 240 saves the new task with the event in event/task database 244 as shown in block 422 of FIG. 4. The activated task is associated with a business area linked to the source of business data that spawned the event.

Task activation rules 226 provide a new task with particular attributes. FIG. 7 is a screenshot 700 illustrating an example new task. In the example illustrated in FIG. 7, task attributes can include a task identifier, user role identifier which the task is created for, the priority level of the task, what type of alert should be sent when notifying a user of the task (i.e., vibrate, audible noise, etc), fraud impact indicator indicating what type of fraud, if any, the task could resolve, a safety impact indicator indicating any safety issues with the task, a compliance impact indicator indicating that the task must be performed to comply with certain laws, if any, and a guest impact indicator indicating what type of impact, if any, the task has on guests in the store. Other example attributes that the task can include that are not necessarily illustrated in FIG. 7 include time the task was created, the event identifier with which the task is created for and attached to, the event's originating store, business area and a user role identifier.

After the new task, which is attached to the event, has been saved in the event/task database 244, task handler 240 determines what user the task should be assigned to as shown in block 424 of FIG. 4. Task handler 240 looks at the task attributes, which indicates what user role the task was created for and also looks at the attached event, which indicates what business area the event originated from. With these two pieces of information, task handler 240 accesses business area database 246 to determine the user or users the task should be assigned to and what client device or devices they are logged in to. Business area database 246 includes information that is stored in user log-in database 231 that indicates what device(s) each user is logged into and what role(s) and business area(s) they have taken on when logging in. This information is stored with the task and the attached event in event/task database 244.

After the task has been assigned to an appropriate user or users, headquarters server 236 sends an alert to the appropriate client device or devices of the appropriate user or users as illustrated in block 426 of FIG. 4. To perform this function, in one embodiment, an instant message communicator 248 is used to push the alert to the correct client device or devices that the user or users are logged in to. The alert indicates that the user or users have been assigned the task.

Figure 8:
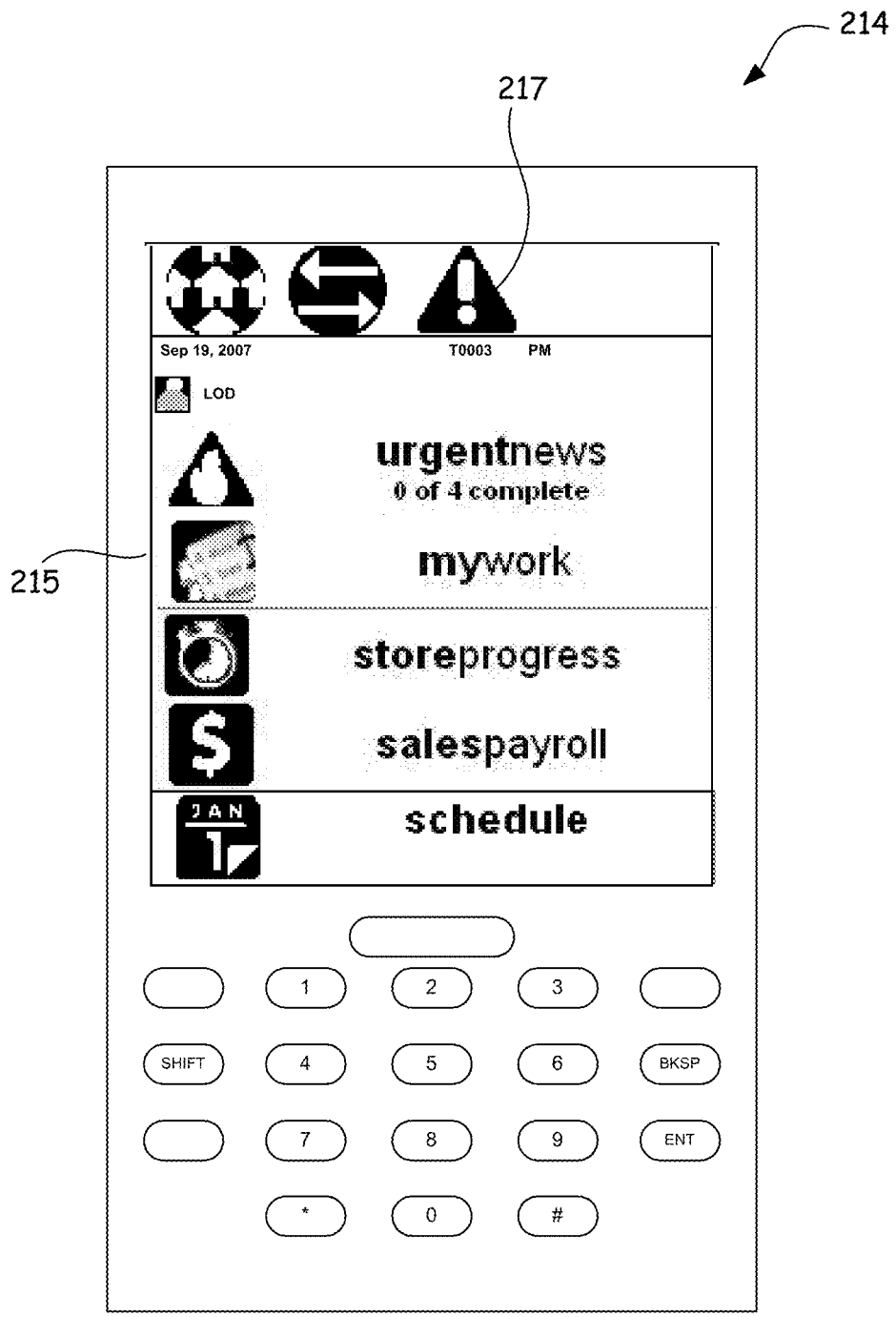
FIG. 8 is an exemplary embodiment of a client device including a display for use in an alert system.

FIG. 8 illustrates an exemplary embodiment of a handheld client device 214 illustrating an exemplary screenshot of the client device 214 receiving an alert. While a user is interacting with client application 230, which is running on handheld client device 214, an alert is received. The alert will appear as an icon 217 on a display screen 215 of the handheld client device 214. In addition, handheld device 214 will vibrate and/or make audible noises, etc in accordance with attributes of the task of which the alert is alerting the user to.

To display what alerts the user has, the user can click on icon 217 with a stylus, finger touch, keypad, etc. Upon clicking on icon 217, client device 214 sends a request to task retriever 242 on headquarters server 236 to retrieve all open tasks for that particular client device given user role(s) of the user who is using the client device and the select business area(s) covered by the user.

Figure 9:
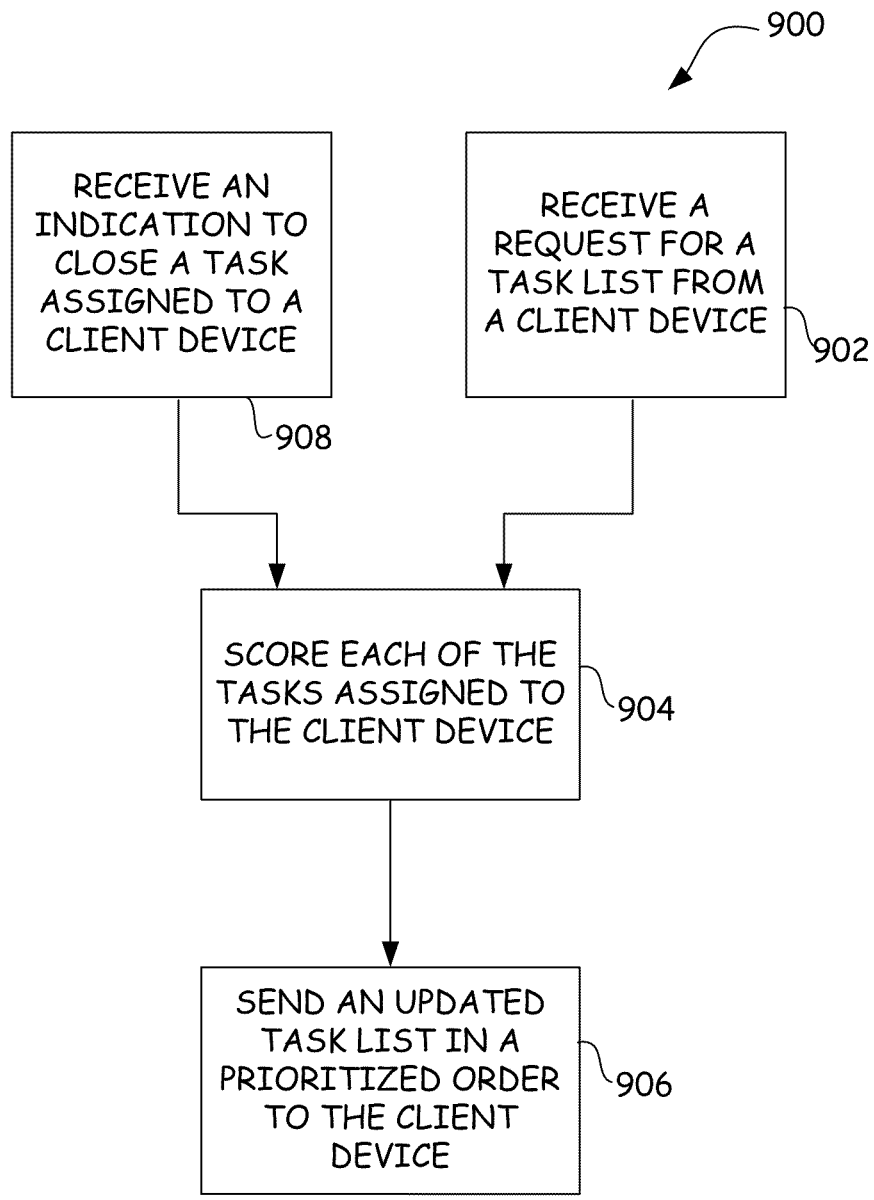
FIG. 9 is a flow diagram illustrating a method of scoring tasks activated by the alert system illustrated in FIG. 2.

FIG. 9 provides a method for processing notifications that result in the creation or refreshing of a list of open tasks for a user. As illustrated in block 902 of FIG. 9, an example of one such notification is a request from a client device for a list of open tasks. Such a request can be made when the client device wants to show a list of tasks to the user, such as when the user selects the alert icon, or when the client device wants to refresh a currently displayed list of tasks. Another example of such a notification is when the user selects an icon on the display to close a task. This results in a request from the client device to task handler 240 to close the task. The request includes sufficient information to identify the task that is to be closed. Upon receiving such a request, task handler 240 marks the task in event/task database 244 as closed. Client application 230 is responsible for instructing task retriever 242 to refresh the task list as indicated by block 908.

Upon receiving a request for a new task list at steps 902 or step 908, task retriever 242 retrieves open tasks from event/task database 244 for the given user role(s) and business areas that the user is logged in to cover. Using scoring rules 228, task retriever 242 scores each of the open tasks as shown in block 904 of FIG. 9.

Scoring rules 228 look at the attributes for each of the open tasks. For example, the scoring rules look at the age of the task and other indicators as discussed above, such as fraud, priority, compliance, safety and guest impact. Based on the values for these attributes, scoring rules 228 assign a score to each task. Under one embodiment, each attribute value is assigned a number and the numbers for the values of a task are added together to provide the score for the task. After adding up the values, the additive score is compared against a value ceiling for the specific type of task. If the ceiling is exceeded, the score is reset to the ceiling.

Figure 10:
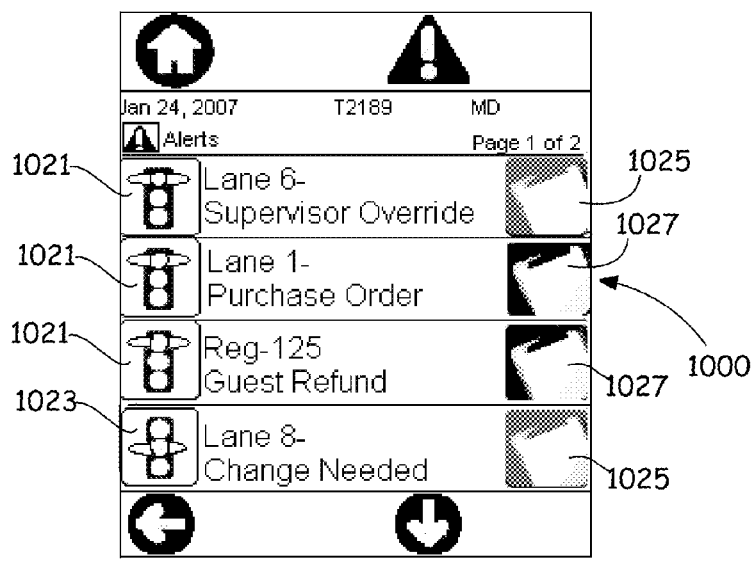
FIG. 10 is a screenshot illustrating an exemplary task list with which a particular client device of a user has been assigned.

After each task is scored, at block 906, headquarters server 236 sends an updated task list to client device 214 with each task placed in a prioritized order and assigned a display icon based on the score for each task. FIG. 10 is a screenshot 1000 illustrating such an exemplary task list with which a particular client device of a user has been assigned. As illustrated in FIG. 10, the user of the particular client device has a plurality of open tasks of which there is enough room on the screen to display four of these tasks with a brief message.

As illustrated in FIG. 10, each task includes a first display icon. Under one embodiment, the first display icon is based on one or more attributes of the task. For example, a stoplight icon may be used to indicate the priority attribute of a task. A stoplight icon with a green light indicates low priority, a stoplight icon with a yellow light indicates medium priority and a stoplight icon with a red priority indicates a high priority. For example, the first task "Lane 6-Supervisor Override," the second task "Lane 1-Purchase Order," and the third task "Reg-125 Guest Refund" has an icon 1021 that indicates high priority. The fourth task "Lane 8-Change Needed" has an icon 1023 that indicates medium priority. Other tasks not particularly illustrated in FIG. 10 can include an icon that indicates low priority or other non-priority type icons, such as a recognition icon. Recognition icons do not have a priority and instead remind the user to congratulate the cashier or other team member for a job well done.

As also illustrated in FIG. 10, each task includes a second display icon. The second display icon is indicative to the user of how the task on the display screen can be closed. For example, as previously discussed, a task can be closed by actually performing the task. In such an instance, after performing the task, an event is generated which uses closing task rules to close the open task. Such a way of closing a task will be apparent from a color of second display icon. In FIG. 10, display icons 1025 are indicative of closing the task by performing the task. While display icons 1027 are indicative of closing the task by clicking on icons 1027. Upon clicking on icons 1027, the task is closed and the task list is refreshed in accordance with the method illustrated in FIG. 9.

Figures 11, 12:
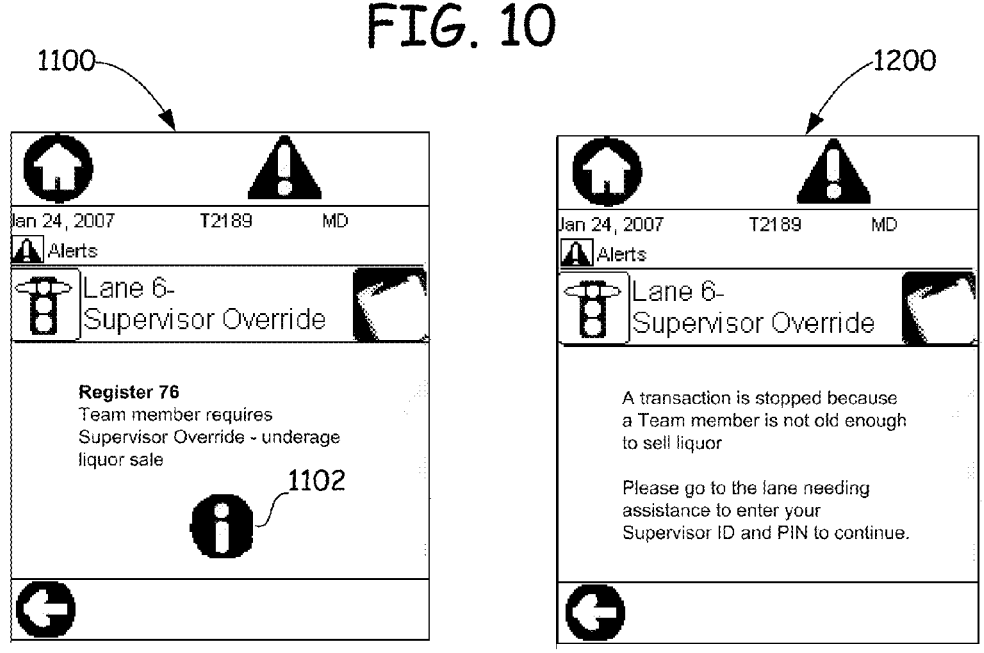
FIG. 11 is a screenshot illustrating exemplary detailed information associated with a task.
FIG. 12 is a screenshot illustrating exemplary instructions associated with a task.

In one embodiment, the user is able to click on the brief messages of the tasks in the task list to learn more information about the task. Example detailed information that was sent to the client application 230 when the client application pulled the tasks from task retriever 242 and displayed them on client device 214 is illustrated as screenshot 1100 in FIG. 11. In conjunction with the detailed information displayed on client device 214, an icon 1102 associated with the detailed information is also displayed. When the user clicks on icon 1102, instructions associated with the task are also displayed. Example instructions to be displayed on client device 214 are illustrated as screenshot 1200 in FIG. 12.

Under some circumstances, a user may fail to perform their assigned task within a given period of time. If the given period of time elapses, the task will no longer appear as an open task when the task list on the client device is refreshed. This occurs because task retriever 242 only retrieves open tasks that have an expiration time/date that is after the current date and time.

Figure 13:
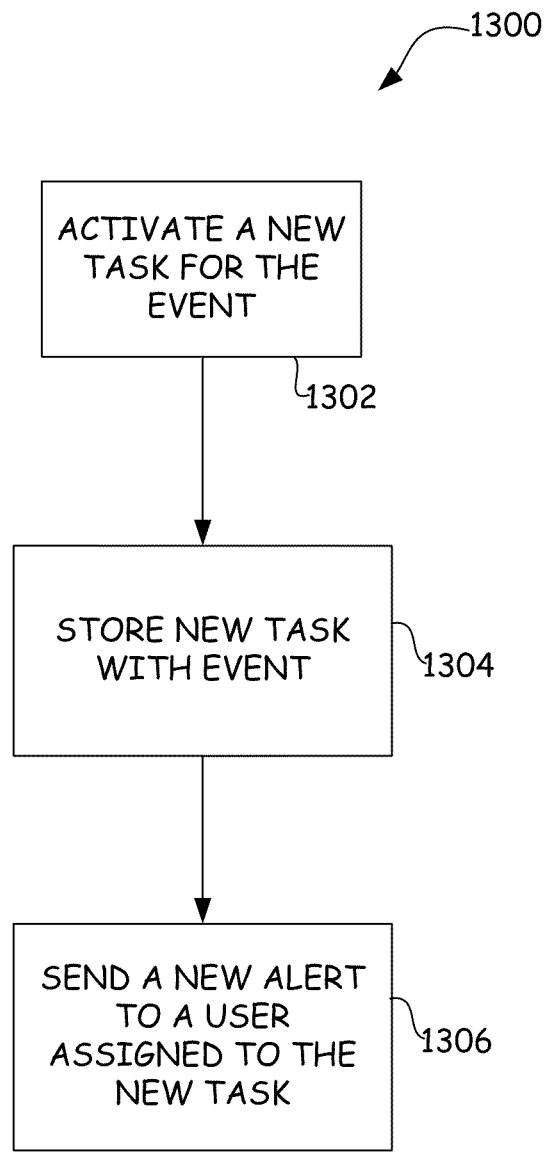
FIG. 13 is a flow diagram illustrating a method of activating a new task by the alert system illustrated in FIG. 2.

FIG. 13 illustrates a method 1300 of sending a new alert if a user fails to perform a task assigned to them before an expiration of time. In such circumstances, task handler 240 activates a new task for the event as shown in block 1302 of FIG. 13. The new task has a role attribute set for it that is based on the task that expired and the role assigned to the task that expired. For example, the task can be assigned to a supervisor of the user who failed to perform the task or can be assigned to a different user of the select user role associated with a different business area. In general, the new task is assigned to a different user of the select user role, who is in a different business area. However, if no other users are logged in to other client devices that are acting in a similar user role, but different business area, a supervisor of the user who failed to perform the task can be assigned the new task. Task handler 240 attaches this new task to the old task and the event and saves it in event/task database 244 at step 1304. As shown in block 1306, a new alert is sent to a client device 214 that the user in the role and business area assigned the new task is logged into or that the supervisor is logged in to. The new alert indicates that the user has been assigned the new task.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   event rules identifying pieces of point-of-sale data that are of interest, wherein the point-of-sale data is generated from a plurality of point-of-sale applications running on a plurality of different point-of-sale registers;
   at least one event generator configured to compare the point-of-sale data to the event rules and to generate an event when a piece of the point-of-sale data satisfies one of the event rules, wherein source information is associated with the generated event including:
   a store identifier identifying a store from which the point-of-sale data that generated the event originated,
   a point-of-sale register identifier identifying a point-of-sale register from which the point-of-sale data that generated the event originated,
   a transaction identifier identifying a transaction from which the point-of-sale data that generated the event originated, and
   an item identifier identifying an item from the transaction from which the point-of-sale data that generated the event originated;
   a processor that compares the source information of the generated event against source information in open events to determine whether the generated event is a duplicate event, wherein open events include previously generated events that have not yet been closed;

wherein the generated event is a duplicate event when at least two pieces of source information of the generated event match at least two pieces of source information in an open event;
an electronic task handler configured to:
  activate a task for a position in a business section of a store in response to the generated event, the task being indicative of an activity to be performed to address the event, being marked as open, being attached to the generated event and being saved together with the generated event in a database of open events;
  assign the task to a user acting in the position of the business section of the store associated with the source information such that the user is assigned to perform the task; and
  send an alert to at least one handheld client device that the user in the position of the business section of the store is logged in to, the alert indicating that the user has been assigned the task.

2. The system of claim 1, wherein the saved event and task includes an indication that the task was assigned to the user.

3. The system of claim 2, further comprising a task retriever configured to:
  retrieve open tasks for the at least one handheld client device from the database based on the user position and the business section of the store for the user logged in to the handheld client device;
  score the open tasks using scoring rules; and
  send the open tasks to the at least one handheld client device in a prioritized order based on the score for each of the open tasks.

4. The system of claim 3, wherein the task retriever is further configured to update the prioritized order of the open tasks for the at least one handheld client device upon at least one of the open tasks being closed.

5. The system of claim 3, wherein the task retriever is further configured to access the database for detailed information regarding one of the open tasks assigned to the user position of the business section of the store and configured to send the detailed information to the at least one handheld client device.

6. The system of claim 1, further comprising closing task rules for use in determining if the event is instructive of closing the task marked as open.

7. The system of claim 1, wherein the alert is sent to the at least one handheld client device via an instant message communicator such that the alert is pushed to the at least one handheld client device.

8. A method comprising:
  receiving an event generated from point-of-sale data that satisfies one of a plurality of event rules, wherein the event includes a plurality of different source identifying attributes including:
    a store identifier identifying a store from which the point-of-sale data that generated the event originated,
    a point-of-sale register identifier identifying a point-of-sale register from which the point-of-sale data that generated the event originated,
    a transaction identifier identifying a transaction from which the point-of-sale data that generated the event originated, and
    an item identifier identifying an item from the transaction from which the point-of-sale data that generated the event originated;
  comparing, by a processor, the source identifying attributes of the received event against source identifying attributes in open events to determine whether the received event is a duplicate event, wherein open events are previously received events generated from point-of-sale data that satisfied one of the plurality of event rules and have not yet been closed and wherein the received event is a duplicate event if at least two of the different source identifying attributes of the received event match at least two source identifying attributes in other open events;
  activating, by the processor, a task in response to the event when the comparison indicates the received event is not a duplicate of the other open events, wherein the task is indicative of an activity to be performed to address the received event; and
  sending, by the processor, an alert to at least one handheld client device for a business area of the store indicating that a user of the at least one handheld client device has been assigned to perform the task.

9. The method of claim 8, further comprising:
  comparing, by the processor, the received event against open tasks by matching at least two of the different source identifying attributes of the received event with at least two different source identifying attributes in one of the open tasks to determine if the received event is instructive of closing any of the open tasks;
  flagging at least one open task as closed based on the comparison; and
  changing an attribute value of the at least one flagged open task to closed.

10. The method of claim 8, further comprising:
  retrieving open tasks for the user of the at least one handheld client device from a database based on the user role and the business area that have been assigned to the user; and
  scoring the open tasks using scoring rules; and
  sending the open tasks to the at least one client device in a prioritized order based on the score for each of the open tasks.

11. The method of claim 8, further comprising:
  activating a new task in response to the received event when the user fails to perform the task assigned to the user before an expiration of time;
  assigning the new task to a supervisor of the user; and
  sending a new alert to at least one client device that the supervisor has logged in to, the new alert indicating that the supervisor has been assigned the new task.

12. The method of claim 8, wherein receiving an event when business data satisfies one of a plurality of event rules comprises receiving an event when point-of-sale data satisfies one of a plurality of event rules.

13. The method of claim 12, wherein the point-of-sale data is generated by a plurality of different point-of-sale applications running on a plurality of different point-of-sale registers.

14. A method comprising:
  providing a database of open events and corresponding open tasks, wherein each open event is generated from point-of-sale data that satisfied an event rule and wherein each open task is indicative of an action that a user needs to perform in response to the corresponding open event, wherein each open task includes a plurality of different source identifying attributes, the plurality of different source identifying attributes of each open task including:
    a store identifier identifying a store from which the point-of-sale data that generated the event and opened the task originated, a point-of-sale register identifier identifying a point-of-sale register from which the point-of-sale data that generated the event and opened the task originated,
a transaction identifier identifying a transaction from which the point-of-sale data that generated the event and opened the task originated, and
an item identifier identifying an item from the transaction from which the point-of-sale data that generated the event and opened the task originated;
receiving a new event generated from point-of-sale data that satisfied an event rule and having a plurality of different source identifying attributes, the plurality of different source identifying attributes of the new event including:
a store identifier identifying a store from which the point-of-sale data that generated the new event originated,
a point-of-sale register identifier identifying a point-of-sale register from which the point-of-sale data that generated the new event originated,
a transaction identifier identifying a transaction from which the point-of-sale data that generated the new event originated, and
an item identifier identifying an item from the transaction from which the point-of-sale data that generated the new event originated;
comparing, by a processor, the new event against open tasks in the database by matching at least two of the different source identifying attributes of the new event with at least two of the different source identifying attributes in one of the open tasks to determine if the new event is instructive of closing any of the open tasks; and
setting, by the processor, an open task as closed based on the comparison between the new event and open tasks using the closing task rules.

15. The method of claim 14, further comprising:
comparing, by the processor, the new event against other open events by matching at least two of the different source identifying attributes of the new event with at least two of the different source identifying attributes in one of other open events to determine whether the new event should be considered a duplicate of an open event if the new event is not instructive of closing any of the open tasks of the source;
activating a task in response to the new event if the comparison indicates the new event is not a duplicate of other open events; and
sending an alert to at least one handheld client device for a store area of the source indicating that the user of the at least one handheld client device has been assigned the task.

16. The method of claim 15, further comprising:
receiving a request from the at least one handheld client device for a task list of all open tasks assigned to the user of the handheld client device;
retrieving open tasks for the user from the database based on the user role and the store area covered by the user;
scoring the open tasks using scoring rules; and
sending the open tasks to the at least one client device in a prioritized order based on the score for each of the open tasks.

17. The method of claim 16, further comprising:
accessing the database for the detailed information regarding the open task; and
sending the detailed information to the at least one handheld client device.

18. The method of claim 16, further comprising:
receiving notification from the at least one handheld client device to close one of the open tasks; and
updating the open task in the database to closed.

\* \* \* \* \*